United States Patent
Xu et al.

(10) Patent No.: US 11,604,655 B2
(45) Date of Patent: Mar. 14, 2023

(54) SYNC POINT MECHANISM BETWEEN MASTER AND SLAVE NODES

(71) Applicants: ATI Technologies ULC, Markham (CA); Advanced Micro Devices, Inc., Santa Clara, CA (US)

(72) Inventors: Wentao Xu, Markham (CA); Randall Alexander Brown, Toronto (CA); Vaibhav Amarayya Hiremath, Bangalore (IN); Shijie Che, Markham (CA); Kamraan Nasim, Woodbridge (CA)

(73) Assignees: ATI Technologies ULC, Markham (CA); Advanced Micro Devices, Inc., Santa Clara, CA (US)

( * ) Notice: Subject to any disclaimer, the term of this patent is extended or adjusted under 35 U.S.C. 154(b) by 50 days.

(21) Appl. No.: 17/095,904

(22) Filed: Nov. 12, 2020

(65) Prior Publication Data
US 2022/0147366 A1    May 12, 2022

(51) Int. Cl.
*G06F 9/44* (2018.01)
*G06F 9/4401* (2018.01)

(52) U.S. Cl.
CPC .................................. *G06F 9/4405* (2013.01)

(58) Field of Classification Search
CPC ...... G06F 9/4405; G06F 21/575; G06F 9/445; G06F 9/44; G06F 15/177; G06F 9/5066; G06F 9/4484; G06F 11/106; G06F 15/80; G06F 15/16; G06F 13/00; G06F 11/20
See application file for complete search history.

(56) References Cited

U.S. PATENT DOCUMENTS

| 7,519,802 | B2 * | 4/2009 | Wheeler | G06F 9/4411 |
| | | | | 713/1 |
| 8,954,721 | B2 * | 2/2015 | Amann | G06F 12/00 |
| | | | | 713/1 |
| 2014/0244991 | A1 * | 8/2014 | Akdemir | G06F 9/4401 |
| | | | | 713/2 |
| 2018/0285126 | A1 * | 10/2018 | Ganesan | G06F 9/4401 |
| 2019/0095224 | A1 * | 3/2019 | Zhong | G06F 1/24 |

* cited by examiner

*Primary Examiner* — Keshab R Pandey
(74) *Attorney, Agent, or Firm* — Polansky & Associates, P.L.L.C.; Paul J. Polansky; Nathan H. Calvert (57) ABSTRACT

In a system with a master processor and slave processors, sync points are used in boot instructions. While executing the boot instructions, the slave processor determines whether the sync point is enabled. In response to determining the sync point is enabled, the slave processor pauses execution of the boot instructions, waits for commands from the master processor, receives commands from the master processor, executes the received commands until a release command is received, and then continues to execute boot instructions. In response to determining the sync point is not enabled, the slave processor continues to execute boot instructions.

20 Claims, 7 Drawing Sheets

FIG. 1

BOOT INSTRUCTIONS

```
void function_common ()
{
    // some processing
    ...
    // syncpoint: SYNC_POINT_BETWEEN_BOOT2_3
    CHECK_POINT (0x50, 0x10);
    // other processing
    ...
}
void main ()
{
    // syncpoint: SYNC_POINT_BEFORE_BOOT1
    CHECK_POINT_WAIT(0x10, 0);
    boot_step1();
    // syncpoint: SYNC_POINT_AFTER_BOOT1
    CHECK_POINT(0x20, 0);

function_common();

// syncpoint: SYNC_POINT_BEFORE_BOOT2
    CHECK_POINT_WAIT(0x40, 0);
    boot_step2();
    // syncpoint: SYNC_POINT_AFTER_BOOT2
    CHECK_POINT(0x50, 0);

function_common();

// syncpoint: SYNC_POINT_BEFORE_BOOT3
    CHECK_POINT_WAIT(0x60, 0);
    boot_step3();
    // syncpoint: SYNC_POINT_AFTER_BOOT3
    CHECK_POINT(0x70, 0);
}
```

FIG. 2

SYNC POINT TABLE

300

| Sync point number (16 bit step & 16 bit point concatenated to form a 32 bit number) | Status (0: disabled, 1: enabled) |
|---|---|
| 0x10_0000 | 1 |
| 0x20_0000 | 0 |
| 0x40_0000 | 1 |
| 0x50_0000 | 0 |
| 0x50_0010 | 0 |
| 0x60_0000 | 1 |
| 0x70_0000 | 0 |

FIG. 3

SYNC POINT HEADER FILE

400

```
#define SYNC_POINT_BEFORE_BOOT1 0x100000
#define SYNC_POINT_AFTER_BOOT1 0x200000
#define SYNC_POINT_BEFORE_BOOT2 0x400000
#define SYNC_POINT_AFTER_BOOT2 0x500000
#define SYNC_POINT_BETWEEN_BOOT23 0x500010
#define SYNC_POINT_BEFORE_BOOT3 0x600000
#define SYNC_POINT_AFTER_BOOT3 0x700000
```

SYNC POINT MECHANISM BETWEEN MASTER AND SLAVE NODES

BACKGROUND

Many multi-node data processing systems include a master processor and a number of slave processors. For example, a data processing system may include a central processing unit (CPU) as a master processor and multiple graphics processing units (GPUs) as slave processors.

When booting a multi-node data processing system, the master and slave processors are typically booted separately. However, there are often interdependencies between the master and slave processors which require the boot process of the slave processors to be synchronized at various phases to the master processor. One manner of achieving such synchronization is to use synchronization points (sync points) within the slave processor boot instructions at which the slave processor will pause and accept commands from the master processor to ensure the slave processor has successfully initialized designated functionalities at the desired point in the boot process.

Use of sync points can result in difficulties in the development and deployment of multi-node systems because existing sync point solutions require the firmware on the master processor and all the slave processors to have an identical view of the sync point during the boot process. These solutions therefore require the master firmware and slave firmware to be developed and updated concurrently.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

A data processing system includes a master processor and at least one slave processor coupled to the master processor by a distributed data fabric. The slave processor is operable to execute boot instructions under control of a bootloader, determine a sync point is enabled, pause execution of the boot instructions, execute commands from the master processor until a release command is received, and then continue to execute boot instructions. In response to determining the sync point is not enabled, the slave processor continues to execute boot instructions.

A method is performed at a slave processor in a data processing system. The method includes executing boot instructions under control of a bootloader, and while executing the boot instructions, determining a sync point is enabled. In response to determining the sync point is enabled, the method pauses execution of the boot instructions, waits for commands from a master processor, receives commands from the master processor, executes the received commands until a release command is received, and then continues to execute boot instructions. In response to determining the sync point is not enabled, the method continues to execute boot instructions.

A system-on-chip includes a master processor embodied in a semiconductor chip and a slave processor embodied in the semiconductor chip and connected to the master processor by a data fabric. The slave processor is operable to execute boot instructions under control of a bootloader, determine a sync point is enabled, pause execution of the boot instructions, execute commands from the master processor until a release command is received, and then continue to execute boot instructions. In response to determining the sync point is not enabled, the slave processor continues to execute boot instructions.

Figure 1:
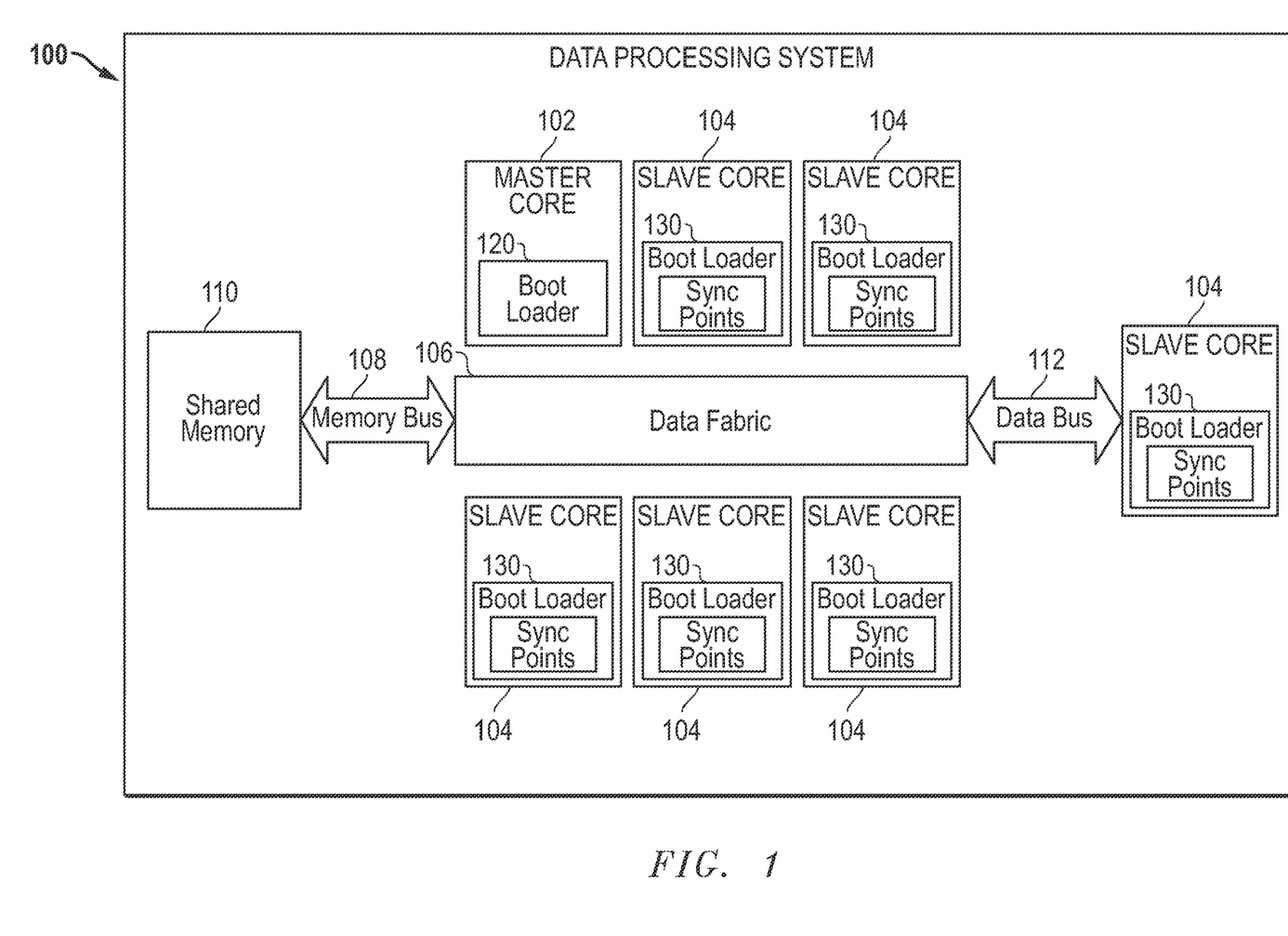
FIG. 1 illustrates in block diagram form a data processing system according to some embodiments.

FIG. 1 illustrates in block diagram form a data processing system 100 according to some embodiments. Data processing system 100 is a multi-node system including a master processor core 102, six slave processor cores 104, and a shared memory 110. In various embodiments, master processor core 102 and slave processor cores 104 are embodied in one or more semiconductor devices, which may be provided in packaged chips, system-on-chips (SOCs), or system-on-package (SOPs) holding multiple semiconductor chiplets. The semiconductor devices may be mounted in a single socket or multiple sockets.

In this embodiment, master processor core 102 is a CPU and slave processor cores 104 are GPUs. Master processor core 102 and slave processor cores 104 may be unitary cores, or may further be a core complex with two or more unitary cores sharing certain resources such as caches. Other embodiments may include any suitable combination of CPUs, GPUs, Accelerated Processing Units (APUs), or other suitable specialized processors. A data fabric 106 connects master processor core 102 to slave processor cores 103, memory bus 108, and data bus 112. Data fabric 106 is preferably a scalable data and control fabric that facilitates data and control transmission across all linked components. In some embodiments, the Infinity Fabric by AMD is used, including a Scalable Data Fabric (SDF) and a Scalable Control Fabric (SCF). Data fabric 106 may include on chip interconnects and off-chip interconnects such as Infinity Fabric On-Package (IFOP). Such a combination is referred to as a distributed data fabric. In this embodiment, a data bus 112 connects data fabric 106 to a slave processor core 104. Suitable implementations for data bus 112 include, for example, Wide Area Functional Link (WAFL), Peripheral Component Interconnect Express (PCIe), and Infinity Fabric InterSocket (IFIS). Memory bus 108 connects data fabric 106 to a shared memory 110, which is typically a DRAM memory. Other components such as memory controllers and peripheral controllers are not shown separately.

Master processor core 102 includes a master boot loader 120 stored on a connected tangible non-transitory memory such as a Flash memory (not shown separately) along with firmware for the master processor core. Each slave processor core 104 includes a slave boot loader 130, also stored on a non-transitory memory along with firmware for the slave processor cores 104. Boot loaders 120 and 130 contain boot instructions for booting the respective processor cores. Slave boot loaders 130 also contain sync points at which the slave boot loader 130 can be instructed to pause and process commands from the master boot loader 120, as further described below.

Figure 2:
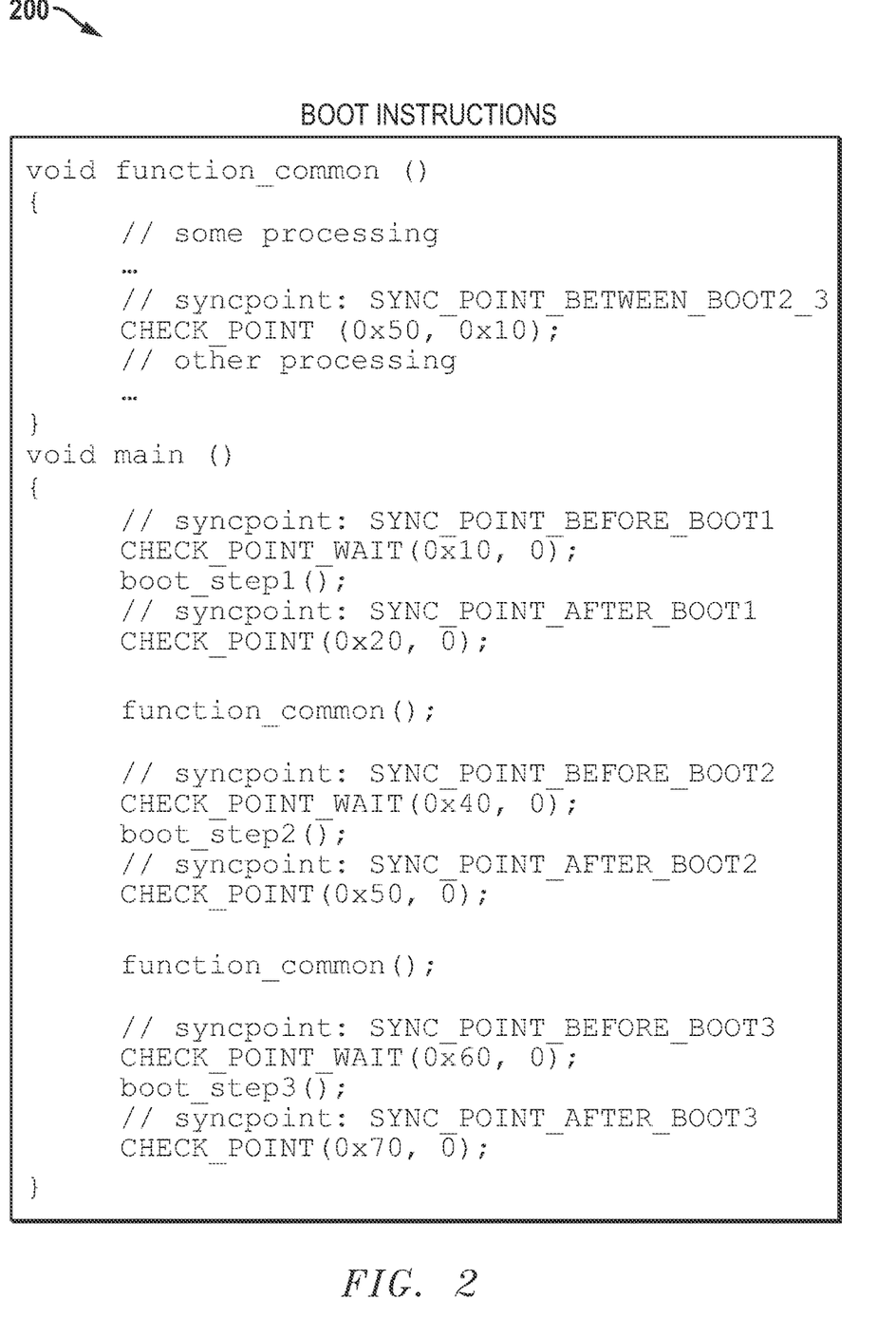
FIG. 2 is a code listing containing pseudo-code for boot instructions of a slave processor according to some embodiments.
Figure 3:
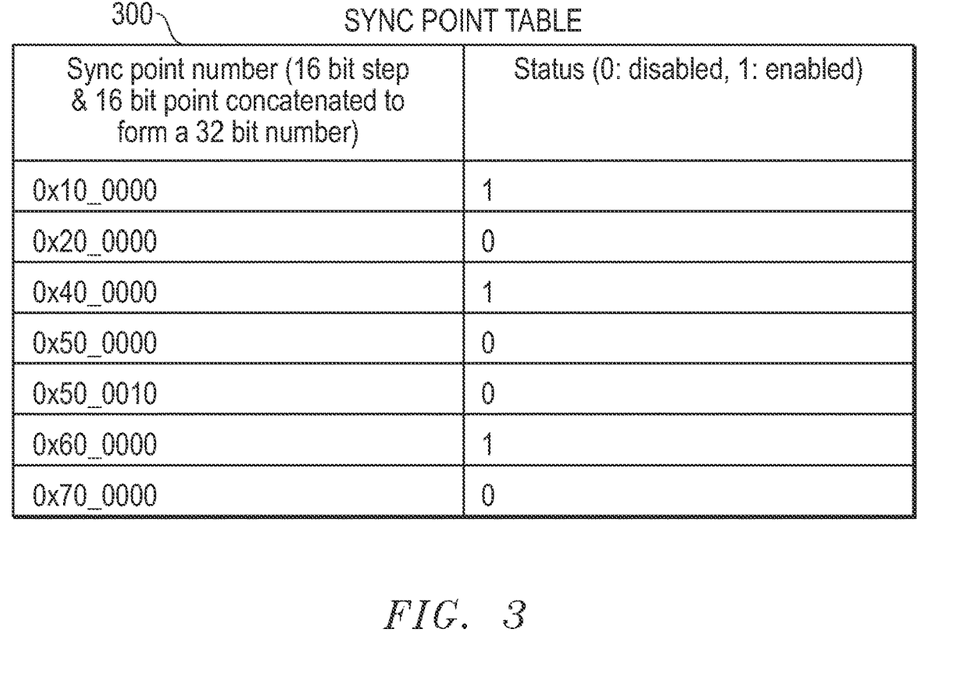
FIG. 3 illustrates a partial sync point table according to some embodiments.
Figure 4:
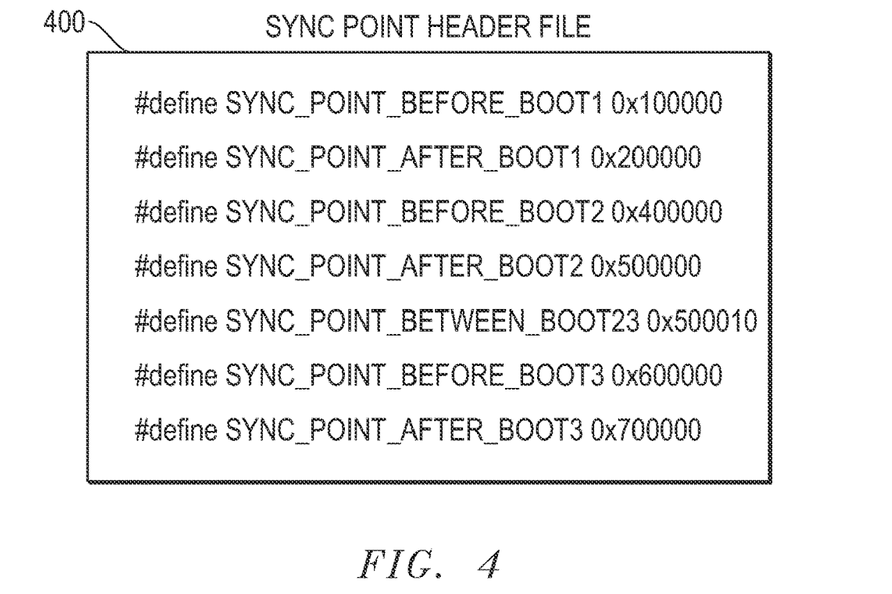
FIG. 4 illustrates a partial sync point header file according to some embodiments.

FIGS. 2-4 illustrate code and data objects for implementing sync points according to some exemplary embodiments. FIG. 2 is a code listing containing pseudo-code for boot instructions 200 of a slave processor according to some embodiments. FIG. 3 illustrates a partial sync point table 300 according to some embodiments. FIG. 4 illustrates a partial sync point header file 400 according to some embodiments.

Referring to FIGS. 2-4, generally the sync point scheme depicted allows sync points at slave processors to be enabled or disabled by the master processor during the boot process, providing many capabilities for backward and forward compatibility between the master and slave processors. Such capabilities provide several advantages and improvements to data processing system functionality and operation as further described below.

Boot instructions 200 show a small example of boot instructions from a boot sequence at each slave processor node. Sync points appear in boot instructions 200 as "CHECK_POINT" and "CHECK_POINT_WAIT" instructions, as can be seen in the depicted pseudo code. The CHECK_POINT_WAIT form of sync point indicates a critical sync point that is always enabled in the boot instructions. The CHECK_POINT form of sync point is an optional sync point that may be disabled or enabled on command from the master processor, and is disabled by default. As shown in boot instructions 200, a common subroutine "function_common" includes some instructions, a sync point, and then further instructions. This subroutine is an example of a sync point being used in a subroutine of boot instructions 200. The main program of boot instructions 200 is called "main" and includes several sync points.

In this embodiment, the sync points are identified by a 32-bit number which is a combination of a step number (16 bits) and a point number (16 bits). These sync points appear in the boot instructions as a macro or function call to one of two sync point processing routines or macros, CHECK_POINT(S, P) and CHECK_POINT_WAIT(S, P), where the S and P parameters are the step and point portions of the sync point number. The step number identifies a position of a major subdivision within the boot sequence such as a major step in the boot sequence. The point numbers appear in order to sequence boot points within the major subdivisions of the boot sequence, such as within a subroutine, by using a local sync point counter to track which step is the current step within the boot flow. This functionality is further described with respect to FIG. 5.

Sync point table 300 is stored in nonvolatile memory for each slave processor core, allowing updates to be made to the sync point table to enable and disable sync points upon command by the master processor. Sync point table 300 includes two columns, the sync point number, including both the step number and point number, and the sync point status indicating whether the sync point is currently enabled. The sync points listed in sync point table 300 preferably appear in order of their sync point number. In this example the status is a binary value with 1 indicating the sync point is enabled. While in this example a table is used, any suitable data structure may be used to record sync points as enabled or disabled.

Sync point header file 400 is provided when the slave processor firmware and boot instructions are produced or upgraded. In sync point header file 400, each sync point defined as a symbol for the sync point number. When the master processor firmware and boot instructions are produced or upgraded, the latest versions of header files from all slave processors are compiled with the master firmware source tree, making the master processor boot instructions aware of all sync points currently used in the slave processor boot instructions.

Figure 5:
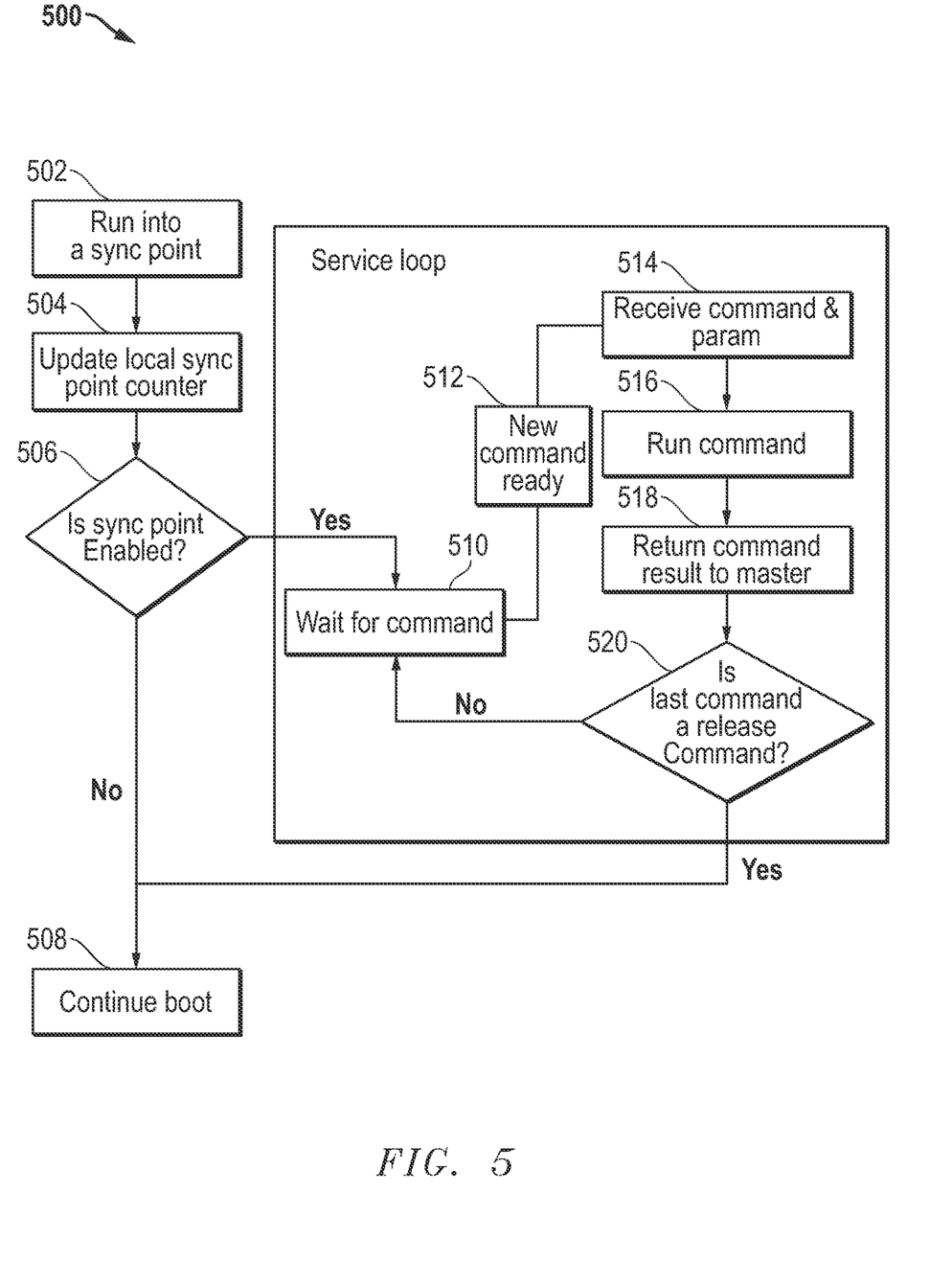
FIG. 5 illustrates in flow diagram form a process for handling a sync point at a slave processor according to some embodiments.

FIG. 5 shows a flow diagram 500 of a process for handling a sync point at a slave processor according to some embodiments. The process begins at block 502, where the boot loader at the slave processor runs until a sync point is encountered, and then enters the subroutine or macro to implement the sync point. The sync point may be of either type, critical or optional.

At block 504, the process updates the local sync point counter. In this embodiment, block 504 includes checking if the point number is zero, indicating the first sync point of a new step has been reached. If so, the step portion of local sync point counter is updated to the step value of the sync point number. If not, the step number S is compared to the current step number in the local sync point counter. If S is not the same as the local sync point counter step number, the process returns from the sync point back to executing boot instructions, without pausing or processing other commands. This feature allows sync points to be employed in subroutines such as the example subroutine function_common in FIG. 2, but not be active until the subroutine is called during the desired step of the boot sequence. For example, the first time function_common is called in FIG. 2, the sync point counter step value is at 20 (the value at the prior CHECK_POINT). Because CHECK_POINT in function_common is called with an S value of 50, block 504 exits the sync point process without pausing. If the S value is the same as the current local sync point counter step value, the process updates the point value of the local sync point counter to P, and continues. For example, the second time function_common is called, the local sync point counter has a step number value of 50 set by the prior sync point (seen one line above the second call to function_common). Therefore, the second time the CHECK_POINT(0x50, 0x10) is called inside function_common, it updates the sync point counter and continues at block 504.

Next at block 506, the process determines whether the sync point is enabled by checking the sync point number in the sync point table. In response to determining the sync point is not enabled, the process goes to block 508 where it leaves the sync point handling routine and continues to execute boot instructions. In response to determining the sync point is enabled at block 506, the process goes to block 510 where it enters the service loop, pauses execution of the boot instructions and waits for commands from the master processor.

When a new command is ready and transmitted from the master processor, as shown at block 512, the process receives the new command and any accompanying parameters from the master processor at block 514. At block 516, the process executes the received command, and returns the results to the master processor at block 518. Then at block 520, if the last command was a release command, the process goes to block 508, where it exits sync point handling and returns to execute boot instructions. Until a release command is received at block 520, the process returns to block 510 to wait for a new command from the master processor. In this manner, the depicted service loop can both pause and execute desired commands from a master processor.

Commands that can be provided in the depicted service loop include commands to run tests, enable functionality, set and query configuration options, set register values, and other functions the master processor may wish the slave processor to perform during the boot sequence. For many commands, responses are sent back to the master processor to fulfill the commands. In this embodiment, the available commands also include several commands specific to managing sync points. Several such commands are as follows:

COMMAND_REPORT_LOCATION is a command that asks the slave processor to report the sync point number of the current sync point. This command helps master processor to know where in the boot sequence the slave processor has paused.

COMMAND_RELEASE is a command that releases the slave from the current sync point. When receiving this command, the slave processor will break from the service loop and continue the boot sequence.

COMMAND_ENABLE_SYNC_POINT is a command that specifies a sync point for the slave processor to enable in the sync point table. The specified sync point can be a real sync point, or a wildcard value. Wildcard values can be "0", meaning no sync point can match, or "0xFFFF_FFFF", which enables the immediate next sync point according to the slave's current sync point table. When receiving this command, the slave processor will search in its local sync point table, starting from the current active counter, for the specified sync point and enable the first sync point that matches. Since the master processor is allowed to have a later version of firmware than the slave processor, the master processor might have specified a sync point that the local slave processor does not support. To handle this scenario, the command can also specify a policy to follow if an exact match to the specified sync point is not found. The options available to select in the event there is not an exact match are to ignore the request and not enable any sync point, to enable the sync point that is immediately before the specified one, or enable the sync point that is immediately after the specified one with regard to the slave's current sync point table.

LOCK_ALL is a command or function that is broadcast to all slave processors telling them to stop at a designated sync point. This command of function may be implemented as a macro at the master processor including multiple lower-level commands.

LOCK_ALL_SYNC is a command or function that is broadcast to all slave processors telling them to stop and wait at a designated sync point until all slave processors are gathered at that sync point. This command or function may be implemented as a macro at the master processor.

RELEASE_ALL_TILL is a command that is broadcast to all slave processors, releasing them from a service loop to continue booting until either a critical sync point or a specified sync point is reached. The specified sync point can be a real sync point, or a wildcard value (like those employed with COMMAND_ENABLE_SYNC_POINT's). For example, this command with a wild card value of 0 means a "RELEASE_ALL" without specifying a sync point to enable. If the specified sync point is an optional sync point, this command also automatically enables that sync point.

During its boot flow, the master processor can send command to slave processors at any time. The slave processors can receive and hold them until the next time they enter a service loop, then execute the commands. Once receiving responses from a slave processor, the master processor is aware that the slave processor has paused execution of boot instructions at a sync point and executing commands. After receiving responses for all commands sent to slave processors, the master processor is aware that all those slaves have joined the sync point. Once confirming the slaves are paused, the master processor can safely program registers on the slave processors. Once this programming is done, the master can issue the COMMAND_RELEASE command to complete the current synchronization operation. The master can also query a slave which sync points it supports.

Figure 6:
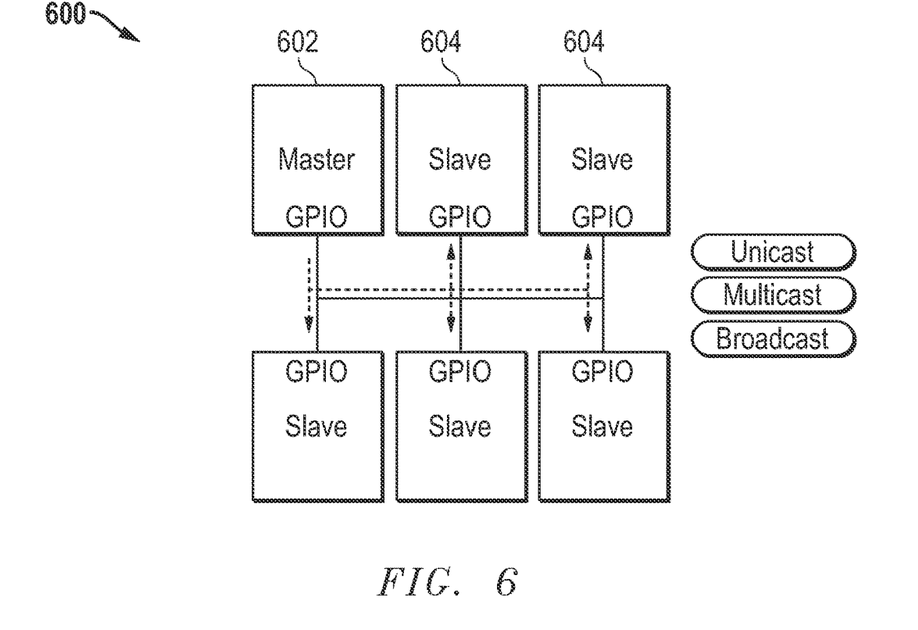
FIG. 6 illustrates in block diagram form a communication scheme employed during a boot process according to some embodiments.

FIG. 6 illustrates in block diagram form a data processing system 600 that implements a communication scheme employed during a boot process according to some embodiments. Data processing system 600 includes a master processor 602 and multiple slave processors 604. During the boot sequence, the boot loader of master processor 602 is in communication with slave processors 604 through a serial connection provided through general purpose input/output (GPIO) pins at each processor. By using GPIO pins, bi-directional communication can be established between processors early in the boot process. While GPIO is employed in this embodiment, other simple serial or parallel communication schemes are suitable for use in other embodiments. As depicted in the diagram of FIG. 6, the communication includes unicast transmission, multicast transmission, and broadcast transmission. In unicast transmission, the master processor issues a command to a single slave processor. This mechanism is usually used to push slave processor configuration information to a single slave processor. In broadcast transmission, master processor 602 issues the same command (with data) to all slave processors 604. In multicast transmission, master processor 602 issues a command to a selected group of slave processors 604. Master processor 602 usually uses this mechanism to push information that is only common among a subset of slave processors 604. No matter which type of transmission is employed, the response from slave processors 604 are individual, from a single slave processor 604 to master processor 602.

Figure 7:
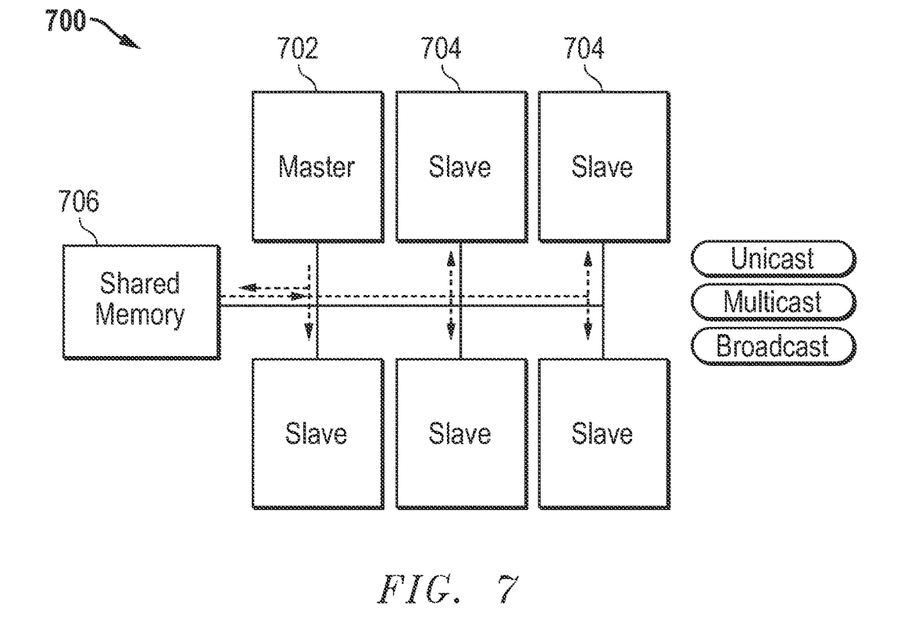
FIG. 7 illustrates in block diagram form another communication scheme employed during a boot process according to some embodiments.

FIG. 7 illustrates in block diagram form another data processing system 700 that implements a communication scheme employed during a boot process according to some embodiments. Data processing system 700 includes a shared memory 706 connected to master processor 702 and slave processors 704. Communications between the boot loaders of master processor 702 is accomplished by each party of the communication accessing a shared memory 706. While in this embodiment a single shared memory is shown, other embodiments include memory at each slave processor 704 which is configured to provide shared access to master processor 702 over the depicted communication link. One or more mailbox registers can be used rather than a memory location. Unicast, multicast, and broadcast communication is accomplished by master processor 702 writing to a unique assigned memory location for each slave processor 704. Return communication is accomplished by each slave processor 704 writing to an assigned location.

Figure 8:
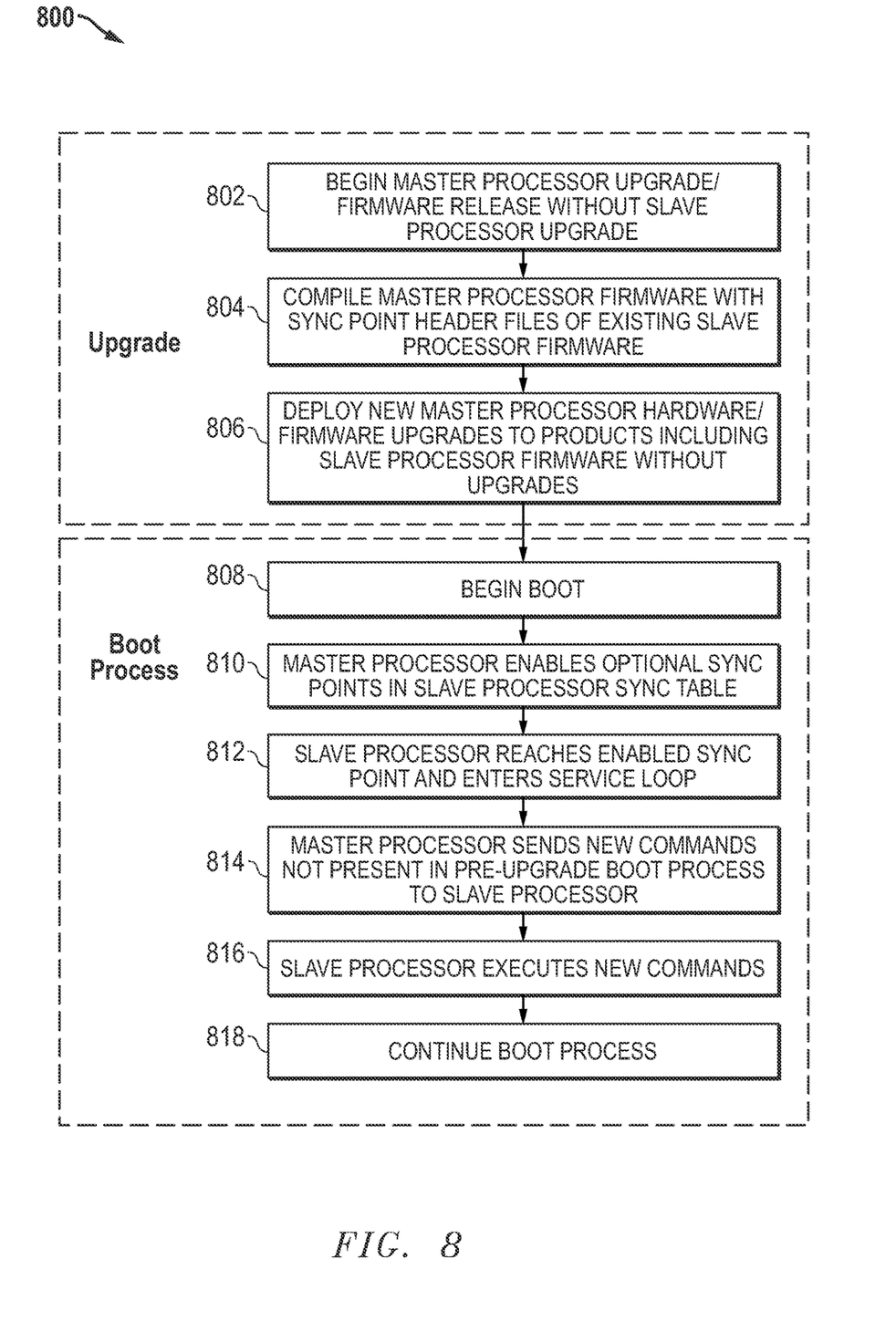
FIG. 8 is a flow diagram of an upgrade and boot process according to some embodiments.

FIG. 8 is a flow diagram 800 of an upgrade and boot process according to some embodiments. The depicted process includes steps performed during the upgrade process when new firmware and boot loader instructions are created and deployed, and further steps performed when the upgraded firmware is used to boot the upgraded system. As further described below, there are three different upgrade scenarios enabled by the use of sync points as described herein. In the first scenario, the master processor uses a newer header file than the slave processors in the field. This scenario happens when master is upgraded but slaves are not. As a result, the master can specify a sync point the slaves cannot recognize, and the master specifies a policy that a slave shall fall back to if a sync point is not found at slave side. In the second scenario, the master processor uses an older header file than the slave processors. This scenario happens when slaves are upgraded but master is not. As a result, the master does not use all the sync points the slaves can support. The third scenario is, of course, that the master processor and slave processors use the same version of sync point header file, and therefore know the same set of sync points. Flow diagram 800 illustrates an example of the first scenario.

At block 802, process begins an upgrade to the master processor, which may include a hardware upgrade as well as a new firmware release, or new firmware alone. The upgrade is done without an upgrade to the slave processor firmware. For example, when the depicted process occurs with a data processing system like system 100 of FIG. 1, the master processor core 102 firmware is upgraded without upgrading firmware for slave processor cores 104.

At block 804, new firmware is compiled for the master processor including upgraded functionality, but using the sync point header files of the existing version of firmware for the slave processors. For example, if the master processor is upgraded from version 1.0 to version 2.0, but the slave processors are not upgraded and remain at version 1.0, the sync point header files of version 1.0 are used. Then, at block 806 the upgrades are deployed to a new product including the upgraded master processor firmware and the older slave processor firmware.

At block 808, the deployed product begins to boot, directed by the boot loader in the master processor with the slave processors controlled by their own boot loaders. At block 810, the master processor enables some of the optional sync points in the slave processor sync table. As discussed above with respect to FIGS. 3-4, the slave processor firmware includes multiple enabled sync points and multiple disabled sync points when it is deployed. The disabled sync points are originally provided in anticipation of future versions of the master processor boot loader and firmware requiring additional sync points which are not known when the slave processor is deployed. These additional sync points remain deactivated by default but can be dynamically activated by a master processor that is aware of them, as shown at block 810. This mechanism de-couples the development/release/update cycles of master processor and slave processor firmware, allowing each upgrade cycle to freely add/remove the awareness of certain sync points.

At block 812, as the slave processor performs its boot process under control of its boot loader, it reaches one of the newly-enabled sync points and enters a service loop (e.g., FIG. 5). The master processor, at block 814, sends new commands to the slave processor which were not present in the prior version of master processor firmware. As shown at block 816, the slave processor in its service loop executes the new commands. Then at block 818 the master processor releases the slave processor from the service loop and the boot process continues. Blocks 812-818 occur for each newly-enabled sync point that is encountered at the slave processor.

As can be understood, this capability allows forward compatibility for the slave processors and backward compatibility for the master processors, enabling new functionality with a more streamlined upgrade process than upgrading all processor firmware at once, thus improving the function of the data processing system.

Figure 9:
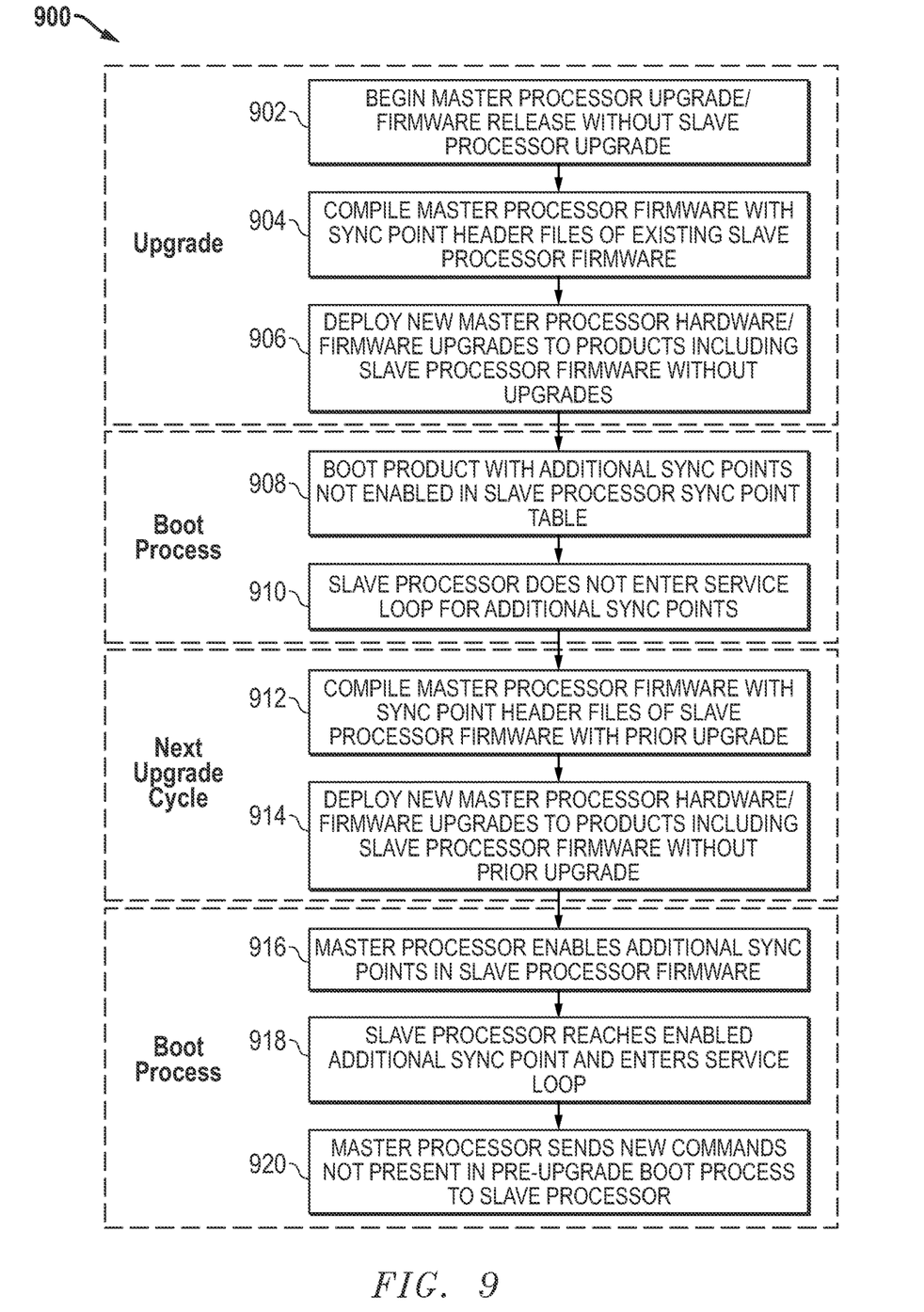
FIG. 9 is a flow diagram of another upgrade and boot process according to some embodiments.

FIG. 9 is a flow diagram 900 of another upgrade and boot process according to some embodiments. Flow diagram 900 illustrates two product upgrade cycles over which a slave processor firmware is upgraded and deployed with an older version of master processor firmware, and later the master processor firmware is also upgraded and deployed.

At block 902, the process includes upgrading the slave processor, which may include a hardware upgrade as well as a new firmware release, or new firmware alone. The upgrade may be to all slave processors or a particular set of them for which improved functionality it provided. The upgraded firmware is compiled at block 904 with additional sync points included in the slave processor boot loader that were not in the prior version of the same boot loader. This new firmware, and optionally new hardware, is deployed to a new product at block 906. The slave processor upgrade is done without an upgrade to the master processor firmware.

At block 908, the deployed product begins to boot, directed by the boot loader in the master processor with the slave processors controlled by their own boot loaders. The additional sync points added during the upgrade are not enabled in the sync point table of the upgraded slave processor. As shown at block 910, during this boot sequence, the upgraded slave processor does not enter a service loop at the additional sync points.

Sometime later at block 912, another upgrade is performed to the master processor. In this upgrade cycle, the prior version of the slave processor firmware is used, and the master processor firmware is upgraded. The master processor firmware is compiled with the sync point header files from the prior version of the slave processor firmware, making the new master processor version aware of the additional sync points previously added to the slave processor firmware. At block 914, the product is deployed with the master processor upgrade including new firmware and possibly new hardware. This deployment includes the slave processor firmware from the prior slave processor upgrade at block 906.

At block 916, during the boot sequence, the master processor enables at least some of the additional sync points in the slave processor sync table. Then at block 918, when the slave processor reaches one of the enabled additional sync points during the boot sequence, it enters the service loop. Then at block 920, the process sends new commands to the slave processor that were not present in the pre-upgraded master processor boot process.

Various parts of data processing system 100 may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates from a synthesis library. The netlist includes a set of gates that also represent the functionality of the hardware including integrated circuits. The netlist may then be placed and routed to produce a data set describing geometric shapes to be applied to masks. The masks may then be used in various semiconductor fabrication steps to produce the integrated circuits. Alternatively, the database on the computer accessible storage medium may be the netlist (with or without the synthesis library) or the data set, as desired, or Graphic Data System (GDS) II data.

The firmware, boot instructions, and data structures described herein may also be embodied as a software program product containing executable instructions stored in a non-transitory computer memory or computer readable storage medium for execution by the microcontroller. In various embodiments, the non-transitory computer readable storage medium includes a magnetic or optical disk storage device, solid-state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

While particular embodiments have been described, various modifications to these embodiments will be apparent to those skilled in the art. Accordingly, it is intended by the appended claims to cover all modifications of the disclosed embodiments that fall within the scope of the disclosed embodiments.

What is claimed is:

1. A data processing system, comprising:
 a master processor;
 at least one slave processor coupled to the master processor by a distributed data fabric, the slave processor operable to:
  execute boot instructions under control of a bootloader;
  determine a sync point in the boot instructions of the slave processor is enabled, pause execution of the boot instructions, execute commands from the master processor until a release command is received, and then continue to execute boot instructions; and
  in response to determining the sync point is not enabled, continuing to execute boot instructions.

2. The data processing system of claim 1, wherein the at least one slave processor is a plurality of slave processors, and wherein the master processor is further operable to send a command to a selected one of the plurality of slave processors in a unicast form and the master processor is further operable to send a command to a selected group of the plurality of slave processors in a multicast form.

3. The data processing system of claim 1, further comprising a sync point table held in non-volatile memory accessible by the slave processor, wherein the slave processor is operable to check the sync point table to determine if the sync point is enabled in the boot instructions of the slave processor.

4. The data processing system of claim 3, wherein the slave processor is further operable to:
 receive a first command from the master processor to enable an identified sync point in the boot instructions of the slave processor;
 check whether the identified sync point is present in the sync point table;
 if the identified sync point is present, enable the identified sync point; and
 if the identified sync point is not present, following a policy identified by the master processor to perform one of enabling a sync point prior to the identified sync point, enabling a sync point subsequent to the identified sync point, and not enabling any sync point in response to the first command.

5. The data processing system of claim 3, wherein the slave processor is further operable to:
 at the slave processor, receive a first command from the master processor to execute boot instructions until an identified sync point is reached;
 check whether the identified sync point is present in the sync point table;
 if the identified sync point is present, execute boot instructions until the identified sync point is reached, pause execution of the boot instructions, and waiting for commands from the master processor; and
 if the identified sync point is not present, execute boot instructions until a sync point prior to the identified sync point is reached, pause execution of the boot instructions and wait for commands from the master processor.

6. The data processing system of claim 1, wherein the sync point comprises a first number representing a position of the sync point in a boot flow sequence of the slave processor, and a second number representing a position of the sync point in a flow of a sub-routine sequence.

7. A method comprising:
 at a slave processor in a data processing system, executing boot instructions under control of a bootloader;
 in response to determining that a sync point in the boot instructions of the slave processor is enabled, pausing execution of the boot instructions, waiting for commands from a master processor, receiving commands from the master processor, executing the received commands until a release command is received, and then continuing to execute boot instructions; and
 in response to determining the sync point is not enabled, continuing to execute boot instructions.

8. The method of claim 7, further comprising:
 upgrading firmware for the master processor without upgrading firmware for the slave processor;
 enabling at least one sync point in the boot instructions of the slave processor that was previously not enabled; and
 then, booting the data processing system and sending commands to the slave processor from the master processor when the slave processor pauses execution of the boot instructions at the at least one sync point.

9. The method of claim 7, further comprising:
 without upgrading firmware at the master processor, upgrading firmware for the slave processor, wherein said upgrade includes inserting additional sync points in the boot instructions of the slave processor;
 disabling the additional sync points in a slave processor sync point table; and
 booting the data processing system.

10. The method of claim 7, further comprising, in response to recognizing the sync point in the boot instructions, updating a sync point counter for the slave processor.

11. The method of claim 7, further comprising:
 at the slave processor, receiving a first command from the master processor to enable an identified sync point in the boot instructions of the slave processor;
 checking whether the identified sync point is present in a slave processor sync point table;
 if the identified sync point is present, enabling the identified sync point; and
 if the identified sync point is not present, following a policy identified by the master processor to perform one of enabling a sync point prior to the identified sync point, enabling a sync point subsequent to the identified sync point, and not enabling any sync point in response to the first command.

12. The method of claim 7, further comprising:
at the slave processor, receiving a first command from the master processor to execute boot instructions until an identified sync point in the boot instructions of the slave processor is reached;
checking whether the identified sync point is present in a slave processor sync point table;
if the identified sync point is present, executing boot instructions until the identified sync point is reached, pausing execution of the boot instructions and waiting for commands from the master processor; and
if the identified sync point is not present, executing boot instructions until a sync point prior to the identified sync point is reached, pausing execution of the boot instructions, and waiting for commands from the master processor.

13. The method of claim 7, wherein determining whether the sync point is enabled includes checking a sync point table in a data section of memory assigned to the slave processor.

14. The method of claim 7, wherein the sync point comprises a first number representing a position of the sync point in a boot flow sequence of the slave processor, and a second number representing a position of the sync point in a flow of a sub-routine sequence.

15. A system-on-chip comprising:
a master processor embodied in a semiconductor chip;
a slave processor embodied in the semiconductor chip and coupled to the master processor by a data fabric, the slave processor operable to:
execute boot instructions under control of a bootloader;
determine a sync point in the boot instructions is enabled, pause execution of the boot instructions, execute commands from the master processor until a release command is received, and then continue to execute boot instructions; and
in response to determining the sync point is not enabled, continuing to execute boot instructions.

16. The system-on-chip of claim 15, further comprising a sync point table held in non-volatile memory accessible by the slave processor, wherein the slave processor is operable to check the sync point table to determine if the sync point is enabled.

17. The system-on-chip of claim 16, wherein the slave processor is further operable to fulfill a command from the master processor to enable a specified sync point in the sync point table.

18. The system-on-chip of claim 16, wherein the slave processor is further operable to:
receive a first command from the master processor to enable an identified sync point;
check whether the identified sync point is present in the sync point table;
if the identified sync point is present, enable the identified sync point; and
if the identified sync point is not present, following a policy identified by the master processor to perform one of enabling a sync point prior to the identified sync point, enabling a sync point subsequent to the identified sync point, and not enabling any sync point in response to the first command.

19. The system-on-chip of claim 16, wherein the slave processor is further operable to:
at the slave processor, receive a first command from the master processor to execute boot instructions until an identified sync point is reached;
check whether the identified sync point is present in the sync point table;
if the identified sync point is present, execute boot instructions until the identified sync point is reached, pause execution of the boot instructions, and waiting for commands from the master processor; and
if the identified sync point is not present, execute boot instructions until a sync point prior to the identified sync point is reached, pause execution of the boot instructions and wait for commands from the master processor.

20. The system-on-chip of claim 15, wherein the sync point comprises a first number representing a position of the sync point in a boot flow sequence of the slave processor, and a second number representing a position of sync point in a flow of a sub-routine sequence.

* * * * *